United States Patent [19]
Christensen

[11] 3,944,258
[45] Mar. 16, 1976

[54] DOUBLE ENDED WAREHOUSE TRAILER

[75] Inventor: Carl O. Christensen, Alamo, Calif.

[73] Assignee: Roll-Rite Corporation, Oakland, Calif.

[22] Filed: Dec. 9, 1974

[21] Appl. No.: 530,746

[52] U.S. Cl. ............ 280/408; 213/64; 280/415 A; 280/489
[51] Int. Cl.² .................................... B62D 53/00
[58] Field of Search ....... 280/400, 402, 408, 415 A, 280/419, 460, 483, 484, 485, 489, 79.2, 104 SA, 409, 410, 411, 47.34, 47.36, 81 R; 213/58, 59, 62, 64; 105/3, 4

[56] References Cited
UNITED STATES PATENTS

| 1,858,769 | 5/1932 | Erskine | 105/4 R |
|---|---|---|---|
| 2,065,532 | 12/1936 | Knox | 280/104 SA |
| 2,113,542 | 4/1938 | Dean | 213/64 X |
| 2,195,636 | 4/1940 | Ulrich | 280/408 |
| 2,333,853 | 11/1943 | Fellabaum | 280/408 X |
| 2,823,047 | 2/1958 | Hutchinson | 280/408 |
| 2,827,307 | 3/1958 | Osborn | 280/415 A |
| 3,827,721 | 8/1974 | Coval | 280/400 |

FOREIGN PATENTS OR APPLICATIONS

| 1,073,875 | 1/1960 | Germany | 280/485 |
|---|---|---|---|
| 146,101 | 5/1921 | Italy | 280/408 |

*Primary Examiner*—M. H. Wood, Jr.
*Assistant Examiner*—David M. Mitchell
*Attorney, Agent, or Firm*—Phillips, Moore, Weissenberger Lempio & Strabala

[57] ABSTRACT

A reversible warehouse wagon is provided with a jointed bed, tandem-mounted center support wheels, steerable wheels supporting both the ends of the bed and hitch means at both ends of the bed to provide a warehouse wagon that is towable from either end having a short turning radius, high directional stability, improved tracking of a towing vehicle and improved support and control for going up and down ramps.

19 Claims, 15 Drawing Figures

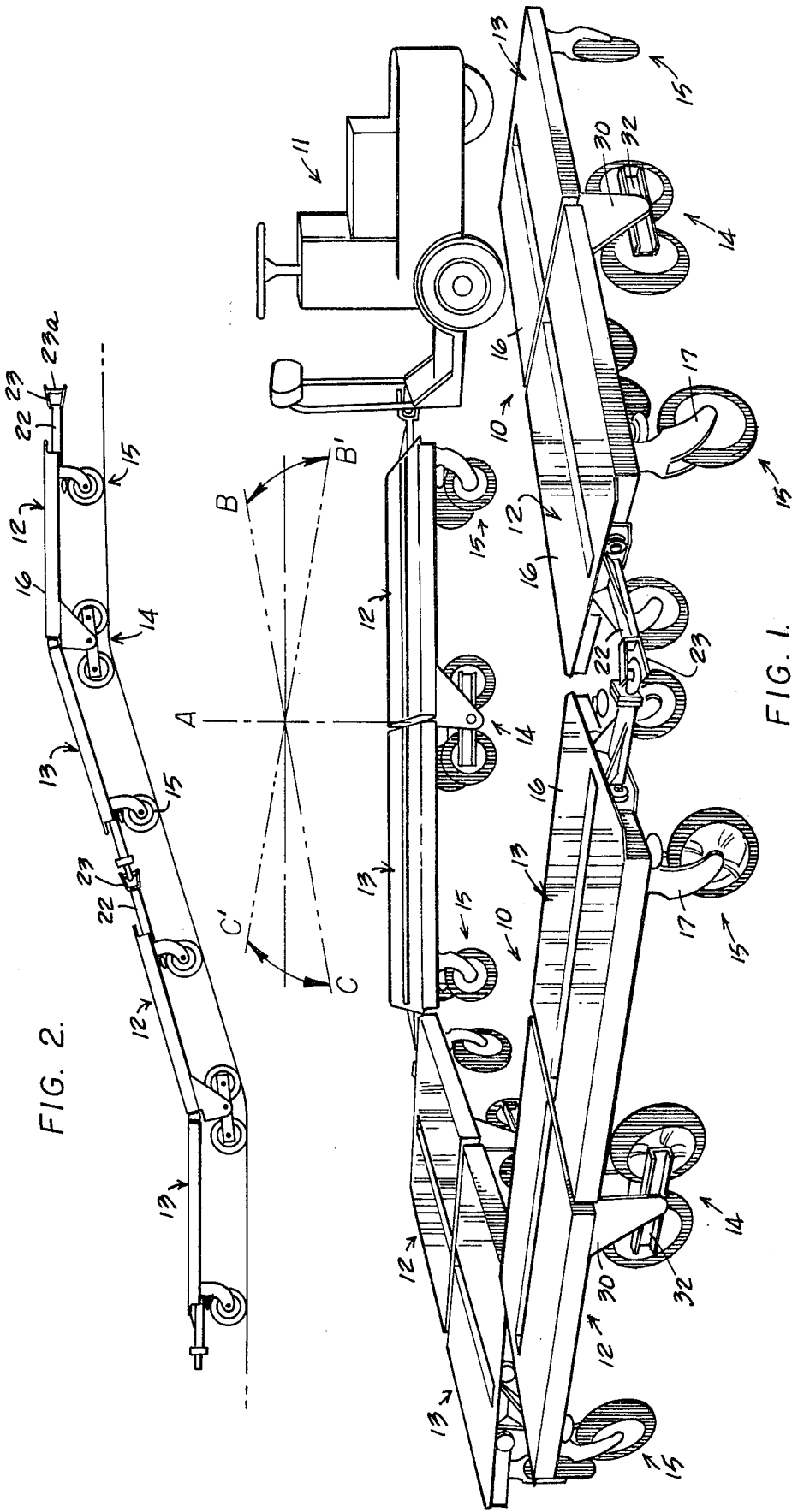

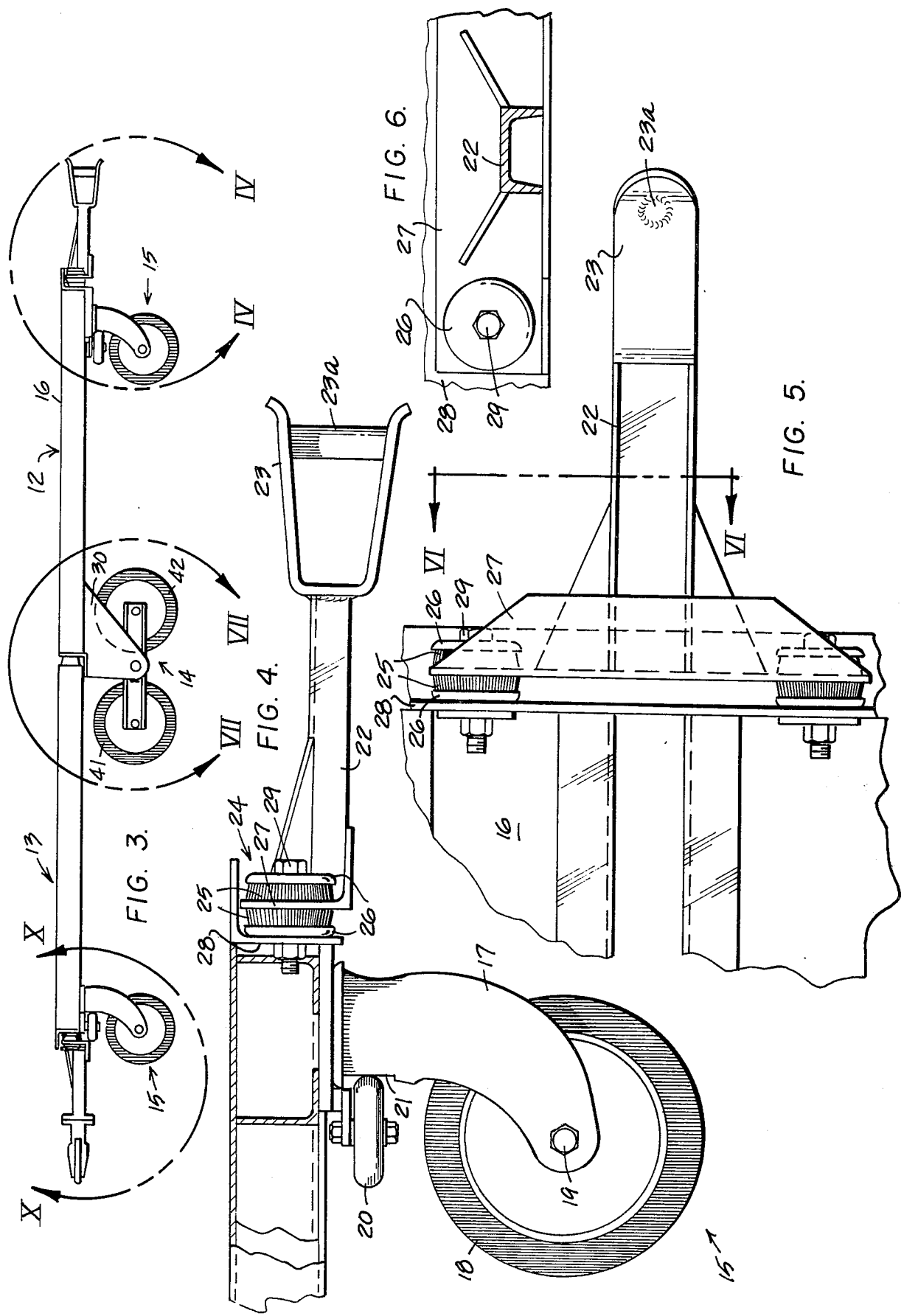

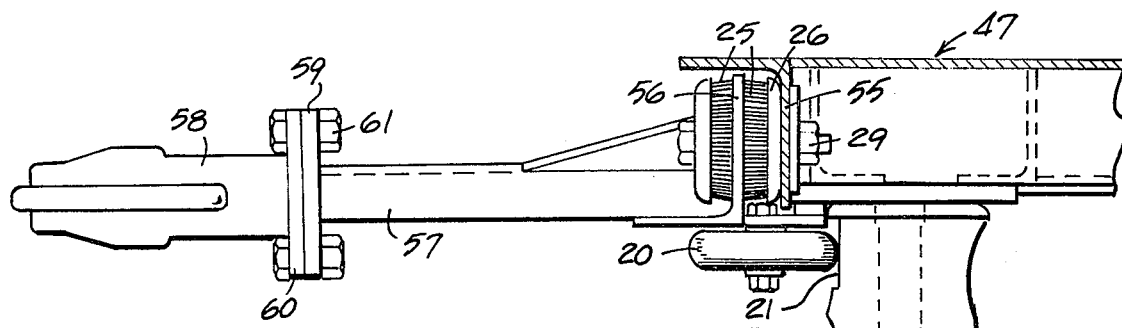
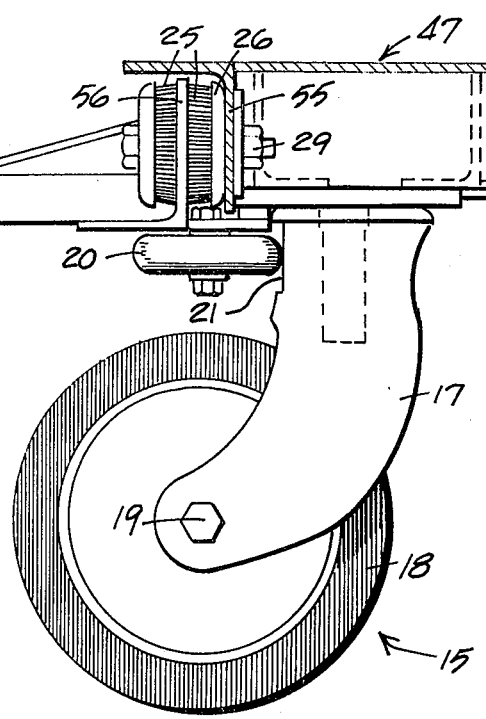
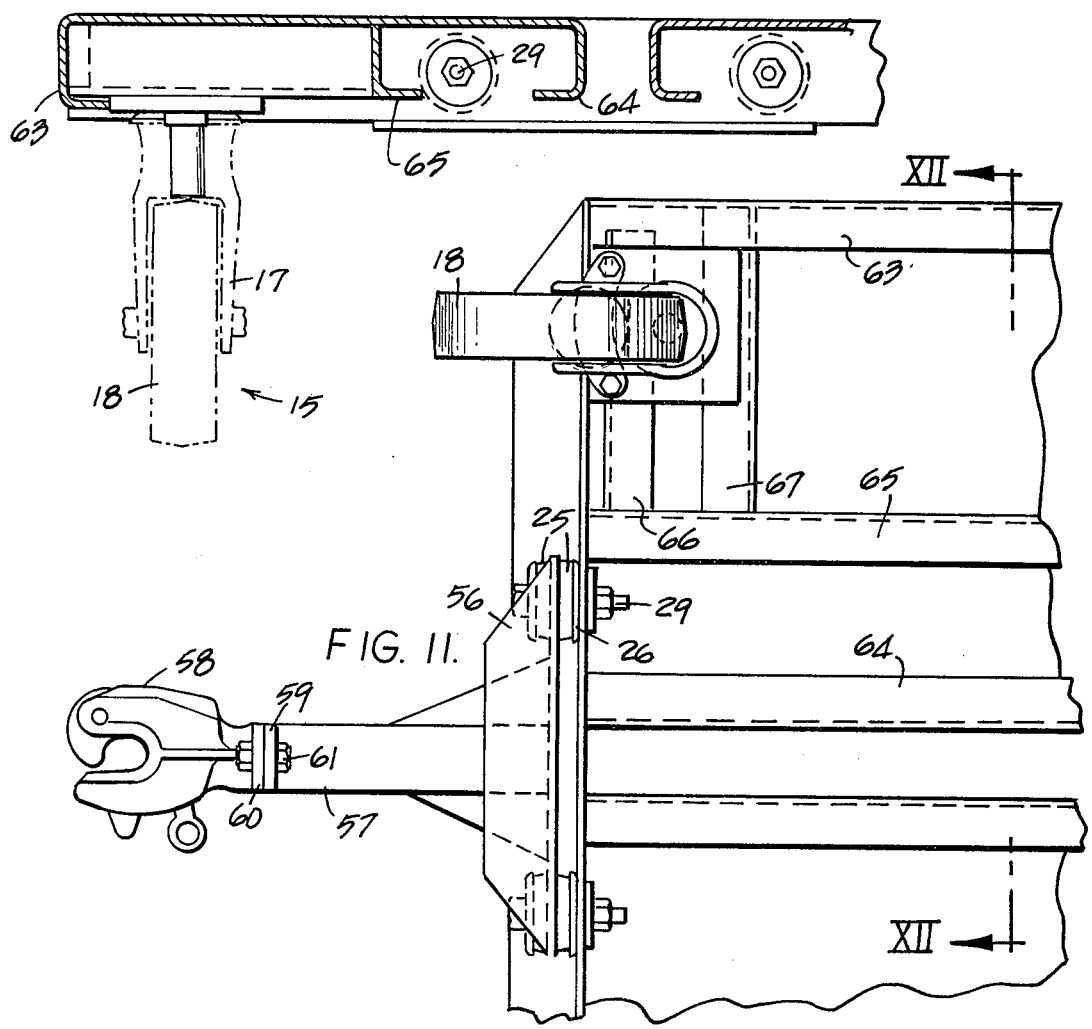

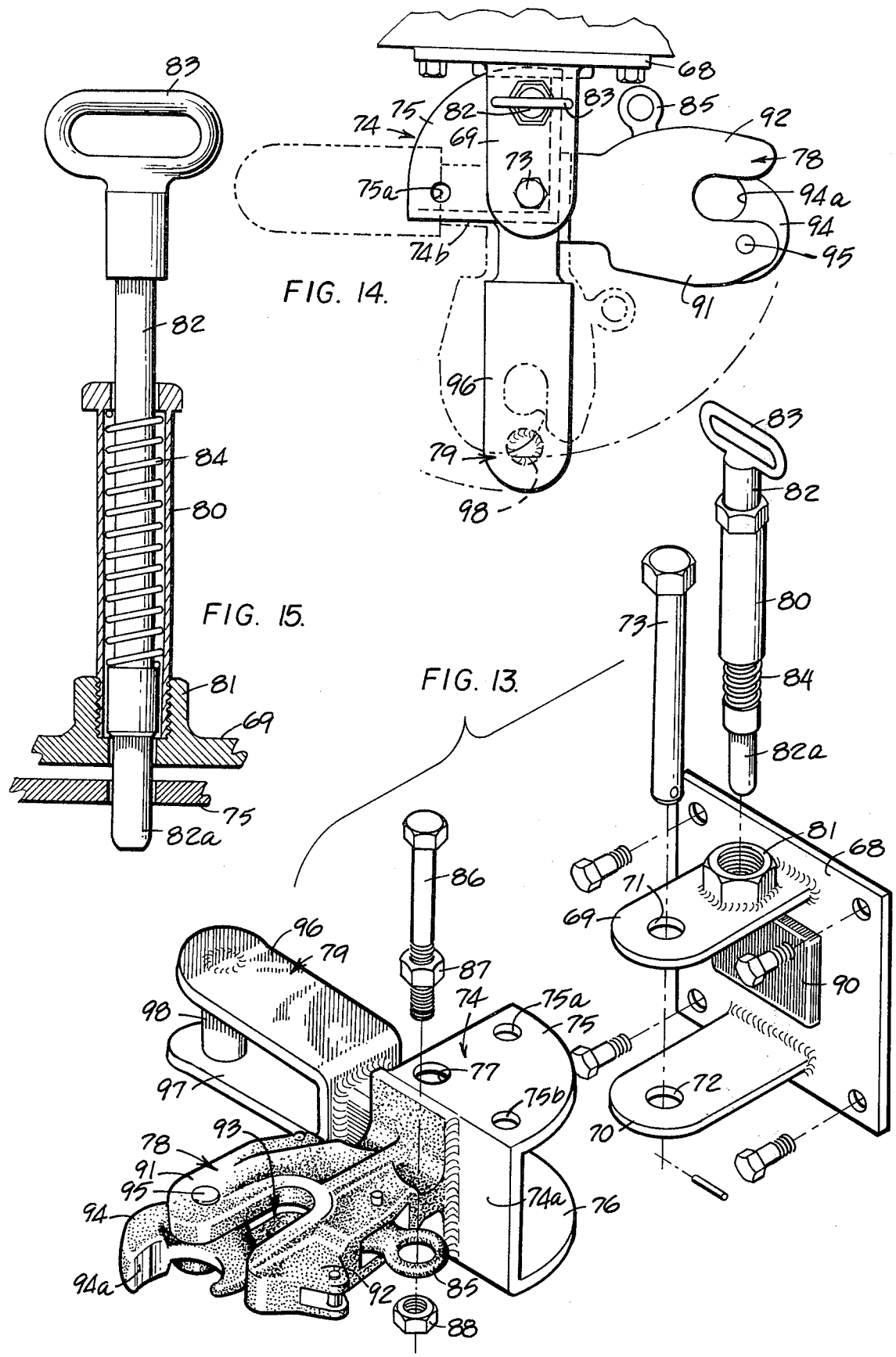

DOUBLE ENDED WAREHOUSE TRAILER

BACKGROUND OF THE INVENTION

The present invention relates to warehouse wagons and pertains particularly to reversible wagons having improved stability.

Small warehouse and yard wagons are extensively used around factories and warehouses for transporting materials and products between various storage and manufacturing areas and loading docks, and around airports for the handling of baggage and other cargo. Such wagons must be highly mobile, and must be small and maneuverable enough to move down narrow aisles and passageways. Such wagons must also be able to be formed in trains in order to have practical cargo-hauling capabilities. It is also desirable that such a wagon have a short turning radius in order to be maneuverable in and about confined areas and be reversible so that it can be used in areas where no turning space is available.

In order to be towable from either end, a wagon must have steerable wheels on both ends. Steerable wheels on both ends of a vehicle, however, generally make a vehicle very unstable so that control of the vehicle becomes a problem. Another desirable characteristic of such wagons is that they have good tracking ability, i.e. the ability to follow closely within the wheels of the towing vehicle. This is in order that a train of such vehicles can be formed in a train which can be taken around relatively short corners.

Still another desirable characteristic of such wagons is that they be able to go up and down ramps and still maintain load support on the wheels as well as stability.

Efforts to enhance one of the above desirable characteristics tend to aggravate another problem. For example, a short turning radius normally negates good tracking ability. Good turning radius by means of steering wheels also tends to negate stability.

Although prior efforts to achieve the above-desired characteristics have produced wagons having one or more of the above-desired characteristics, the prior art has failed to develop a wagon having all of the above-desired characteristics to an optimum degree.

SUMMARY AND OBJECTS OF THE INVENTION

It is a primary object of the present invention to overcome the above-noted problems of the prior art.

Another object of the present invention is to provide a warehouse wagon having a short turning radius, excellent tracking ability, and a high degree of stability.

A further object of the present invention is to provide a warehouse wagon having reversible characteristics, a short turning radius, good tracking ability, and a high degree of stability.

Still another object of the present invention is to provide a warehouse wagon having reversible characteristics and the ability to negotiate ramps with a high degree of stability.

In accordance with the primary aspect of the present invention, a warehouse wagon is provided with steerable wheels at both ends, stabilizing tandem wheels at the center, and a hinged bed to provide a wagon that is towable from either end having optimum operating characteristics.

BRIEF DESCRIPTION OF THE DRAWINGS

The above and other objects and advantages of the present invention will become apparent from the following description when read in conjunction with the accompanying drawings, wherein:

FIG. 1 is a perspective view of a train of wagons constructed in accordance with the present invention;

FIG. 2 is a side elevational view of a portion of the train of FIG. 1;

FIG. 3 is a side elevational view of one of the wagons of FIG. 1;

FIG. 4 is an enlarged elevational view with portions broken away of the portion of FIG. 3 partially enclosed by arrows IV—IV;

FIG. 5 is a plan view from the underside of the portion illustrated in FIG. 4;

FIG. 6 is a sectional view taken generally along lines VI—VI of FIG. 5;

FIG. 10 is an enlarged elevational view partially in section of the portions partially encircled by numerals X—X of FIG. 3;

FIG. 11 is a plan view from below of the portion of FIG. 10;

FIG. 12 is a sectional view taken generally along lines XII—XII of FIG. 11;

FIG. 13 is an exploded perspective view of an indexing hitch for the wagons of the present invention;

FIG. 14 is a plan view of the hitch of FIG. 13; and,

FIG. 15 is a sectional view of a latching pin of the hitch of FIG. 13.

DETAILED DESCRIPTION OF THE PREFERRED EMBODIMENT

Figure 7:
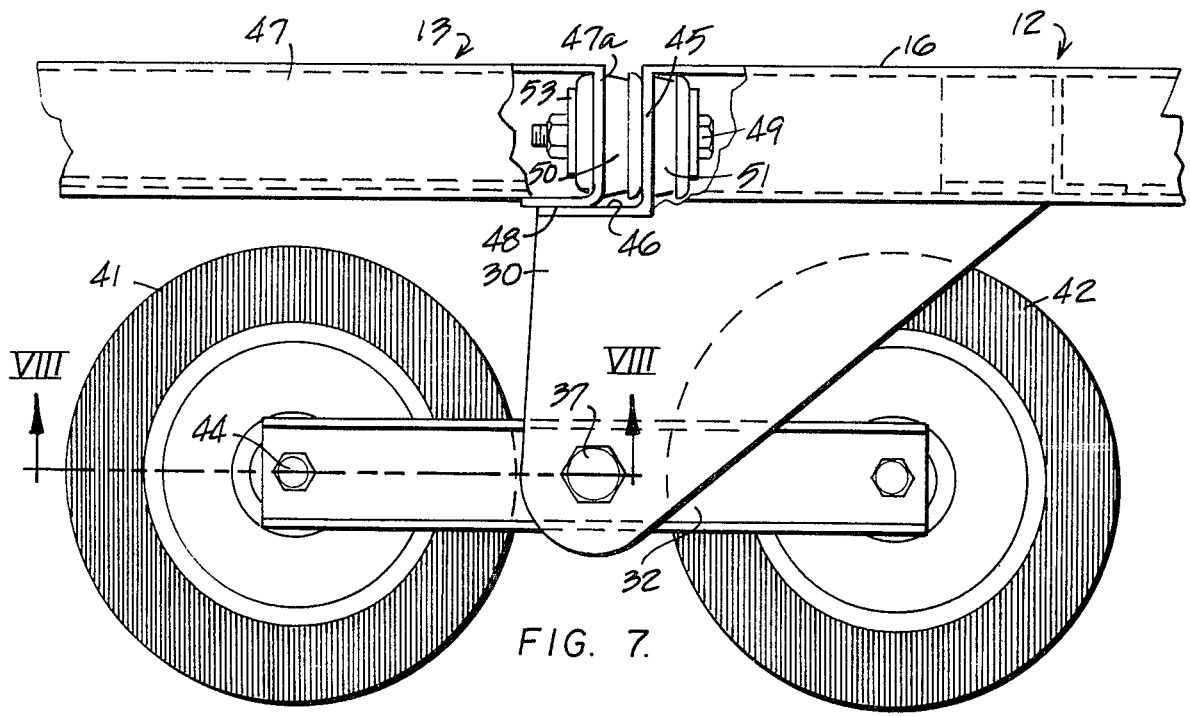
FIG. 7 is an enlarged elevational view with portions broken away of the portion of FIG. 3 partially encircled by arrows VII—VII.
Figure 9:
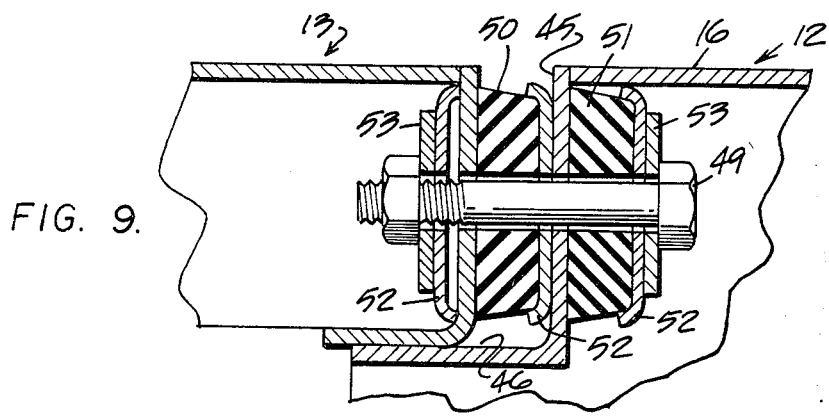
FIG. 9 is a detailed view in section of the connecting means between the beds of FIG. 7.

Turning now to the drawings, and particularly to FIGS. 1 and 2, there is illustrated a plurality of wagons in accordance with the present invention coupled together to form a train. Looking particularly at FIG. 1, four identical wagons, each identified generally by the numeral 10, are connected together and to a towing vehicle, such as a small tractor, indicated generally at 11, to form a train. Each wagon includes a primary or first section or assembly, including a bed or deck 12 connected by a resilient joint connecting means to a rear or second section having a bed 13. The center of each wagon is supported on two pairs of tandem-mounted wheels, which are nonsteerable and also independently swivel-mounted at the center thereof and designated generally by the numeral 14. Each end of the wagon is supported by steerable wheels which are preferably casters and designated generally by the numeral 15. The wagon preferably includes a pair of casters at each end, although a single caster would be sufficient in some applications. Each wagon also includes a tongue and hitch at each end thereof to make the wagon essentially reversible. In other words, a wagon or string of wagons are equally steerable and can be towed equally well from either end thus each wagon is double front ended.

It will be seen from FIG. 1 that because of the configuration with center support wheels and turning wheels at both ends, each wagon will have a very short turning radius. This turning radius will be approximately the same as the length of the wagon. As graphically illustrated in FIG. 1, a wagon will essentially turn about an axis A which is located approximately at the center between the four wheels of the center sets of tandem wheels 14. Upon turning about such an axis, a point on the front of the wagon will move from a point graphically illustrated at B to a point B' where the center of the wagon remains at the same lateral position, and a point C at the rear of the wagon will move from position C to position C'. Thus when the front end of the wagon swings inward the rear end of the wagon swings outward. A trailing wagon would then follow the trailing edge of the forward wagon and thus the front end would swing outward such that the center wheels of the following wagon would be pulled around such that the following wagon will essentially track in substantially the same track as the forward wagon. Thus, the geometric configuration of the illustrated wagons is such that each subsequent wagon will substantially track in the tracks of the towing wagon such that the wagons will not cut corners as much as conventional wagons of equal length. This arrangement provides a wagon that requires much less turning space in general than a conventional one of the same length or even lesser length not having this geometric configuration.

The joint between the primary and secondary sections of the wagon is articulated such that the two sections can pivot to a limited extent about a horizontal axis to permit each wagon to go up or down a ramp as best illustrated in FIG. 2 and at the same time keep all the wheels in engagement with the supporting surface of the ramp. As seen in FIG. 2, the two sections of the wagon can pivot upward or downward with respect to each other a substantial number of degrees to insure that when the wagon is at the top of a ramp the two sections may pivot downward with respect to each other and when the wagon is at the bottom of the ramp the two sections can pivot upward with respect to each other.

Turning now to FIG. 3, each wagon includes a primary assembly 12 having a load-supporting platform or deck 16 which may be any desired configuration designed to accommodate any required load to support it at its forward end with a pair of casters 15. These casters may be of any suitable type. For example, they may be of the type disclosed and claimed in my co-pending application Ser. No. 530,745, filed Dec. 9, 1974, entitled "Anti-Flutter Caster". These casters are of a self-steering and self-centering type having a fork 17 rotatable about a vertical axis secured to support a platform 16 and depending downward to straddle and rotatably support a rubber-tired wheel 18 about a suitable axle 19. The caster includes damping means in the form of a variable diameter resilient wheel 20 engaging a flat 21 on the fork 17 tending to bias the fork 17 into a predetermined centered position. This construction would further enhance the directional stability of the wagon as well as prevent the casters from fluttering or spinning about its steering axis if a caster should lose contact with the road surface.

A suitable tongue 22 having a female hitch or coupling 23 on its outer end valve extends outward from the support platform 16 for engagement with a male hitch member of a vehicle or other wagon. The tongue 22 is resiliently connected to the support platform 16 by suitable connecting means 24. The connecting means includes a pair of resilient washers 25 and a pair of end washers 26. A flange 27 of the tongue 22 is sandwiched between the two resilient washers 25 and the end washers 26 and the whole assembly secured in a suitable manner to a front wall portion 28 of the platform 16 by suitable means such as a bolt 29. This provides sufficiently rigid connection of the tongue to the wagon to pull very heavy loads and maintain stability of the vehicle, yet permits sufficient flexibility to accommodate uneven support surfaces and traversing up and down ramps, for example.

Figure 8:
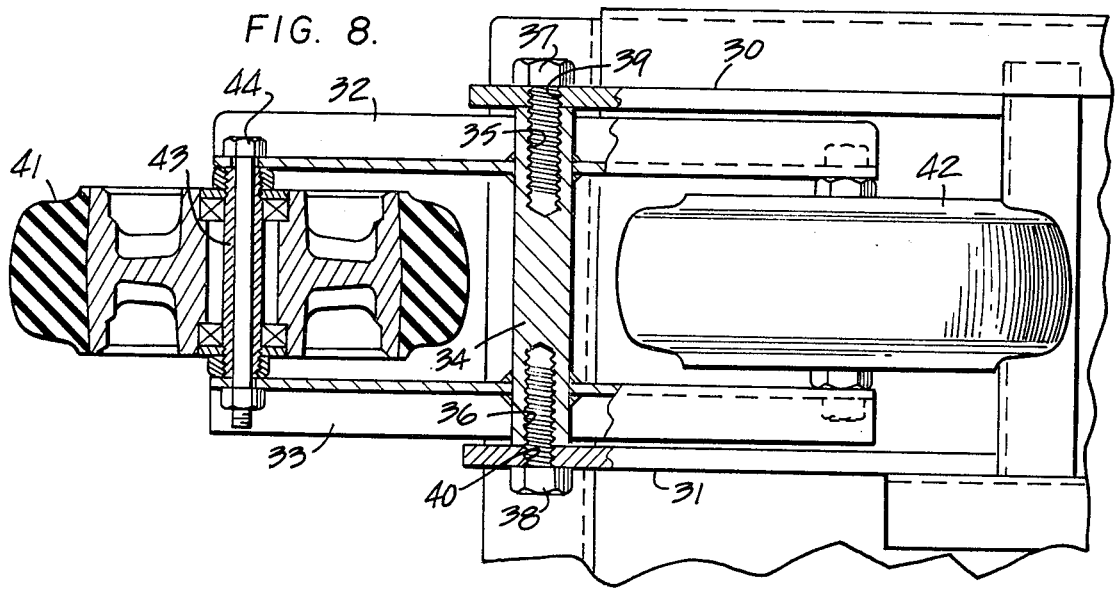
FIG. 8 is a partial sectional view taken generally along lines VIII—VIII of FIG. 7.

The center end and wheel support assembly is best illustrated in FIGS. 7 and 8 and includes a pair of downwardly extending brackets or struts 30, 31 secured in a suitable manner, such as by welding, to the underside of support platform 16 and extending downward therefrom. These two brackets or struts define a fork assembly between which is mounted a rocker beam assembly comprising a pair of rocker arms or beams 32, 33 which are suitably secured, such as by welding, to a common shaft 34 defining a rocker shaft which is pivotally mounted to the fork assembly. The rocker shaft 35 includes drilled and capped bores 35, 36 in each end thereof in which is threadably engaged a pair of bolts 37, 38 for securing the rocker shaft 34 between the fork and fork assembly 30, 31. The screws or bolts 37 also threadably engage bores 39, 40 formed in bracket 30, 31. The bolts 37, 38 are preferably secured tightly within the bores 39, 40 in a manner to prevent rotation thereof. The rocker shaft 34 then rotates or rocks upon the extension of the bolts 37, 38. Thus, a threaded trunion support is defined for the rocker shaft and rocker beams.

This arrangement provides a tight trunion support of the rocker arm assembly and eliminates slack between the rocker beam assembly and the forks 30, 31 that would permit lateral movement or flutter of the rocker assembly with respect to the forks. This enhances the directional stability of the wagon, as will be described further. A pair of preferably identical wheels 41, 42 are mounted in line on the rocker beams, such as by a suitable sub-axle assembly including an inner axle 43 and a suitable axle 44 such as a bolt for securing the assembly to each end of the rocker beams 32, 33. This tandem wheel arrangement restrains the wagon to go in a straight line until deliberately turned.

The support platform or deck 16 terminates with an end wall 45 and means defining a support ledge 46 at the inner end thereof. The support ledge 46 is disposed directly over the axis of the rocker shaft 34. A second support platform or deck assembly 47 is supported at its inner end 48 on the ledge 46 and is secured by suitable resilient means such as an assembly of resilient and rigid washers secured together by means of suitable means such as a bolt 49. A washer assembly preferably includes one resilient washer 50 disposed between the ends of platforms or decks 16 and 47 and a second resilient washer 51 which is mounted on the opposite side of one of the end walls such as 45. A plurality of rigid washers 52 is required at the outer end of resilient washer 51 but may also be placed at other suitable positions within the assembly shown. Additional washers 53 may also be utilized when necessary.

The resilient and pivotal connection of the two decks 16, 47 together would normally require a pair of such couplings, although in some instances more may be required. These couplings, as seen, can be adjusted to a limited degree and provide a relatively sturdy semi-permanent coupling of the decks together to define the bed or cargo platform of the wagon and at the same time provide sufficient flexibility to permit flexing between the two decks or platforms sufficient to accommodate reasonable irregularity encountered around a warehouse or factory yard.

Referring now to FIGS. 10–12, the forward end of the second section 13, including decks 47, is provided with casters identical with those of the forward end of the section 12. This forward end of the section 13 is essentially identical to the forward end of the section 12, with the exception of the hitch or coupling. Thus, identical reference numerals will identify identical elements. This section includes a tongue 54 which is secured as the previous tongue to a forward wall 55 of deck 47 by resilient means as previously described. The tongue itself includes a flange member 56 having a forwardly extending beam portion 57 with a coupling member 58 designated as a male coupling member secured in a suitable manner thereto such as a means of flanges 59, 60 and a plurality of bolts 61.

Thus, one end of the wagon is equipped with a male coupling member and the opposite end is equipped with a female coupling member for coupling the wagons end to end. It should be noted that both ends of the wagon may be equipped with identical couplings which may be pinned together so that an end of one wagon can be connected to either end of another wagon. However, because of the need for rapid coupling an automatic male coupling, as best disclosed in FIG. 11 and further described in FIGS. 13–15, is provided at one end of the wagon. This coupling is a conventional design and automatically latches upon engagement with the pin of the female coupling. This eliminates the necessity for a vehicle operator to dismount and place a pin in the coupling to connect the wagons.

Turning now to FIGS. 11 and 12, more detailed construction of the decks or load platforms of the wagon are illustrated. The decks centrally, as best seen in FIG. 12, comprise a pair of plates having their sides rolled under to define L-shaped side walls 63 and 64 with the ends of the plates secured to end walls 64. Spaced slightly from the first plate laterally is a second plate substantially identical in construction and secured to the same end wall 64. A flange member 65 is spaced from the sides and welded to the plate extending longitudinally thereof. This provides support means for suitable support members 66 and 67 for the casters. This provides a light and strong construction.

Turning now to FIGS. 13–15, as illustrated, an indexing coupling assembly which is secured to the rear of a tractor to permit the tractor to couple to either end of any of the wagons. The hitch or coupling assembly comprises a base plate 68 which is substantially rectangular in configuration and including a pair of brackets 69 and 70 extending outward therefrom. Base plate 68 is secured in a suitable manner to the back of a tractor. The brackets 69 and 70 include aligned bores 71 and 72 through which a pin 73 is extended to pivotally mount an indexing body 74. The body member includes upper and lower walls 75 and 76 having the configuration of a quarter sector of a circle, which include bores 77 which align with bores 71 and 72 to receive pin 73. The body 74 includes a pair of substantially rectangular side walls 74a and 74b disposed at 90° to each other and including secured thereto female coupling member 78 and a male coupling member 79. A retaining pin assembly includes a housing 80 suitably mounted in a mounting body 81 of the bracket assembly and includes a plunger 82 having an indexing pin portion 82a which extends downward to engage either one of a pair of pilot holes 75a and 75b in the upper wall 75 of the body 74 to retain the indexing body in a selected position. A spring 84 biases the plunger 82 downward to the engaged position as shown in FIG. 15. A suitable handle 83 is provided for an operator to grasp and disengage the indexing pin 82a.

The female coupling member 78 may be the automatically latching type as illustrated and include a releasing lever 85 to which is added an extension 86 in the form of a bolt with nuts 87 and 88 securing it to the lever 85. Suitable cushioning means 90 is mounted on base plate 68 to cushion the movement of the indexing body 82 between its respective positions and to reduce rattling of the members.

The female coupling member 78 comprises a generally bifurcated body portion comprising a pair of parallel extending side members 91 and 92 defining a slot 93 therebetween. One side member 91 includes a slot in which a generally C-shaped latching member 94 is pivotally mounted such as by suitable pin means 95. The C-shaped latch member 94 includes a semi-cylindrical face portion 94a which, together with the inner portion of slot 93, defines a substantially cylindrical opening for receiving a pin or the like of a second coupling member.

The male coupling member 79 includes a body having a pair of spaced bracket-like members 96 and 97 extending outward and defining a substantially clevis-like structure. A cylindrical pin 98 is secured in a suitable manner between the two members 96 and 97. In the preferred embodiment as illustrated, the pin member 98 is welded between the two members. The male coupling member 79 is of the type that is adapted to be received within the slot 93 of the female coupling member 78. It is to be understood, however, that this indexing coupling assembly principle may be applied to substantially any type of coupling or hitch arrangement.

It will also be appreciated that one of the indexing-type coupling assemblies may be secured to one end of each of the warehouse wagons, thus resulting in an arrangement whereby any wagon can be hitched to either end of any other wagon. Such an arrangement provides infinite possibilities and considerably enhances the adaptability and convenience of the present construction.

This arrangement permits either the male or the female coupling member to be indexed to the coupling position as best illustrated in FIG. 14. Thus, a tractor equipped with such an indexing coupling can connect to either end of a wagon having suitable couplings thereon.

While the present invention has been described with respect to specifically illustrated embodiments, it must be understood that numerous changes and modifications may be made therein without departing from the spirit and scope of the invention as defined in the appended claims.

I claim:

1. A double front ended warehouse wagon comprising:

a cargo-supporting bed, said bed including first and second sections semi-permanently joined end-to-end by articulated joint means for pivotal movement of said sections solely about a horizontal axis relative to one another;

at least a first set of non-steerable wheels mounted beneath said bed at said flexible joint means to support said bed at the center thereof, wherein said first set of wheels comprises at least a first pair of wheels mounted in tandem;

at least one self-steering wheel secured beneath said bed at each end to support the respective ends of the bed; and, hitch means secured at each end of said wagon for cooperating with said self-steering wheels for defining a front end at each end of said wagon for hitching said wagon to another vehicle for towing in either direction.

2. The warehouse wagon of claim 1 wherein said self-steering wheels are casters.

3. The warehouse wagon of claim 1 wherein said steerable wheels comprise a pair of casters at each end of said wagon.

4. The warehouse wagon of claim 1 wherein said first set of wheels comprises a first pair of wheels mounted in tandem at one side of said wagon and a second pair of wheels mounted in tandem at the other side of said wagon, said pairs of wheels being independently mounted.

5. The warehouse wagon of claim 4 wherein said steerable wheels comprise a pair of casters at each end of said wagon.

6. The warehouse wagon of claim 1 wherein:

said cargo-supporting bed comprises a first section defining a substantially rigid flat cargo-supporting platform, at least a first pair of struts secured beneath and extending downward at one end of said platform, a support ledge extending across said one end of said platform, a second section defining a substantially rigid flat cargo-supporting platform having one end resting on and supported by said ledge, and resilient means disposed between and securing said first and second sections together for limited relative resilient pivotal movement about a horizontal axis.

7. The cargo wagon of claim 6 in combination with at least a second substantially identical cargo wagon hitched thereto and to a towing vehicle to define a train;

said hitch means comprising interlocking male and female coupling members;

each of said wagons having a male coupling member secured to one end thereof and a female coupling member secured to the other end thereof;

said towing vehicle having hitch means including a male coupling member and a female coupling member mounted on indexing means so that either of said coupling members can be indexed to a coupling position.

8. The warehouse wagon of claim 7 wherein said first set of wheels are tandem-mounted and pivotally supported from said first pair of struts.

9. The warehouse wagon of claim 8 wherein said first pair of struts extend downward at one side of said platform and a second pair of struts extend downward from the other side of said platform and a second set of tandem-mounted wheels are pivotally supported from said second pair of struts.

10. The warehouse wagon of claim 9 wherein said steerable wheel comprises a pair of casters mounted to and supporting each end of said bed.

11. The warehouse wagon of claim 10 wherein said hitch means includes a tongue resiliently secured to and extending longitudinally from each end of said wagon, one of said tongues including a male coupling secured to the outer end thereof, and the other of said tongues including a female coupling secured to the outer end thereof.

12. The warehouse wagon of claim 9 wherein said first and second sets of tandem wheels include a pair of beams for rotatably mounting each set of wheels;

said wheels are rotatably mounted between said beams; and said beams include a rocker shaft secured to said beams and pivotally mounted between said pairs of struts.

13. The warehouse wagon of claim 12 wherein each of said rocker shafts includes a bore formed in each end thereof; and, a pair of threaded shafts secured to said struts and threadably engaging said bores for pivotally supporting said rocker shafts.

14. A double front-ended warehouse wagon comprising:

a substantially rectangular cargo-supporting bed comprising a first section defining a substantially rigid flat cargo-supporting platform, at least a first pair of struts secured beneath and extending downward at one end of said platform for mounting tandem wheels, a support ledge extending across said one end of said platform, a second section defining a substantially rigid flat cargo-supporting platform having one end resting on and supported by said ledge, and resilient means disposed between and semi-permanently securing said first and second sections together for limited relative resilient pivotal movement about a horizontal axis;

first and second pairs of non-steerable tandem-mounted wheels mounted beneath said bed at the center thereof to said pair of struts;

at least one self-steering wheel secured beneath said bed at each end for supporting the respective ends of the bed; and, hitch means secured at each end of said bed for defining a double front-ended wagon and for hitching either front end of said wagon to another vehicle for towing in either direction.

15. The cargo wagon of claim 9 wherein said steerable wheels comprise a pair of casters at each end of said wagon.

16. The cargo wagon of claim 14 wherein said first pair of struts extend downward at one side of said platform for mounting said first pair of wheels and a second pair of struts extend downward from the other side of said platform for mounting said second set of tandem-mounted wheels.

17. The cargo wagon of claim 16 wherein said hitch means includes a tongue resiliently secured to and extending longitudinally from each end of said wagon, one of said tongues including a male coupling secured to the outer end thereof, and the other of said tongues including a female coupling secured to the outer end thereof.

18. A double ended warehouse wagon comprising:

a cargo-supporting bed, said cargo-supporting bed comprises a first section defining a substantially rigid flat cargo-supporting platform, at least a first pair of struts secured beneath and extending downward at one end of said platform, a support ledge extending across said one end of said platform, a second section defining a substantially rigid flat cargo-supporting platform having one end resting on and supported by said ledge, and flexible joint means including resilient means comprising a first pair of resilient washers laterally spaced from one another between the ends of said sections and a bolt extending through each washer and connected to each of said sections securing said first and second sections together for limited relative pivotal movement about a horizontal axis;

at least a first set of wheels mounted beneath said bed at said flexible joint means to support said bed at the center thereof;

at least one steerable wheel secured beneath said bed at each end to support the respective ends of the bed; and, hitch means secured at each end of said wagon for hitching said wagon to another vehicle.

19. A double ended warehouse wagon comprising:

a cargo-supporting bed comprising a first section defining a substantially rigid flat cargo-supporting platform, at least a first pair of struts secured beneath and extending downward at one end of said platform, a support ledge extending across said one end of said platform, a second section defining a substantially rigid flat cargo-supporting platform having one end resting on and supported by said ledge, resilient means including a pair of washers, one of said washers being secured to one end of each of a pair of bolts disposed between and securing said first and second sections together for limited relative pivotal movement about a horizontal axis;

at least a first set of wheels mounted beneath said bed at said flexible joint means to support said bed at the center thereof;

at least one steerable wheel secured beneath said bed at each end to support the respective ends of the bed; and, hitch means secured at each end of said wagon for hitching said wagon to another vehicle.

* * * * *